United States Patent [19]

Abernethy

[11] 4,107,581

[45] * Aug. 15, 1978

[54] FLUORESCENT LAMP INSERT WITH CONDUCTIVE ROD SUPPORT

[76] Inventor: Robert R. Abernethy, 7295 Walton Rd., Walton Hills, Ohio 44116

[ * ] Notice: The portion of the term of this patent subsequent to Oct. 11, 1994, has been disclaimed.

[21] Appl. No.: 675,801

[22] Filed: Apr. 15, 1976

Related U.S. Application Data

[63] Continuation-in-part of Ser. No. 575,628, May 8, 1975, Pat. No. 4,053,811.

[51] Int. Cl.$^2$ ...................... H05B 41/16; H05B 41/46; H01G 1/02

[52] U.S. Cl. ...................................... 315/324; 315/95; 315/189; 315/312

[58] Field of Search ............... 315/119, 121, 122, 126, 315/187, 188, 189, 192, 193, 228, 240, 312, 313, 324, 95; 307/157; 240/51.11 R, 153

[56] References Cited

U.S. PATENT DOCUMENTS

| | | | |
|---|---|---|---|
| 774,812 | 11/1904 | Wurts | 315/126 X |
| 3,956,665 | 5/1976 | Westphal | 315/312 X |

*Primary Examiner*—Eugene R. LaRoche

*Attorney, Agent, or Firm*—Maky, Renner, Otto & Boisselle

[57] ABSTRACT

A non-light emitting insert for a fluorescent lighting fixture is used in place of a fluorescent lamp to complete a plural lamp ballast circuit so that the ballast is effective to illuminate properly any remaining fluorescent lamp coupled therein. The insert appears externally as a conventional fluorescent lamp including end electrical terminations that fit in the sockets of a fluorescent lighting fixture, and to an extent the insert duplicates the electrical effect of a lamp in a two lamp ballast circuit. Using the insert a reduction in the light output and a substantially corresponding reduction in consumed electrical power are achieved for a plural lamp fluorescent lighting fixture arrangement while at the same time the components of the ballast circuit are operated at reasonably normal electrical and temperature levels. Moreover, an electrically conductive rod extending between the ends of the tubular portion of the insert may be employed both to support the insert at least partially relieving the tubular portion of that function and to effect the substantial completion of the ballast circuit.

8 Claims, 10 Drawing Figures

1
2
3
4
5
6
7
11
12
13
14
15b
15a
16b
16a
17
18
19

11'
12'
13'
14'
15b'
15a'
16b'
16a'
17'
18'
20
20a

11"
13"
14"
15b"
15a"
16b"
16a"
17"
18"
19"
19a 21
22
23
24
25
26
27
EXIT 30
31
32
33
34
35
36
37
38

40
41
42
43
44
45
46
47
48
49
50
51
52

FIG. 6
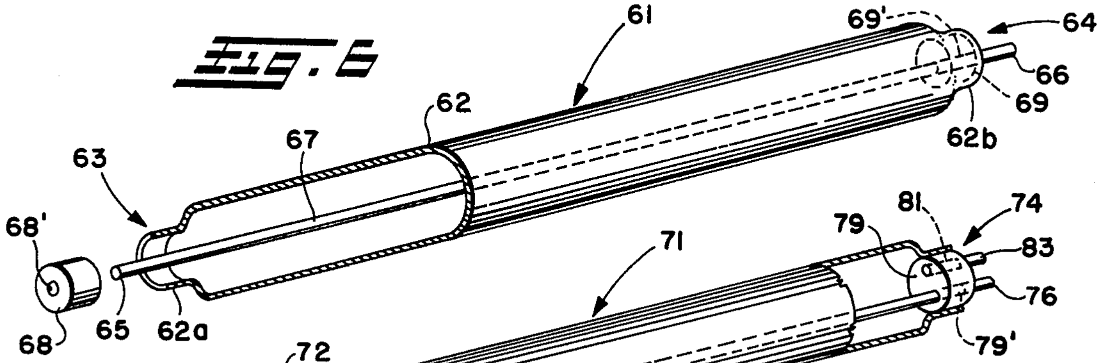
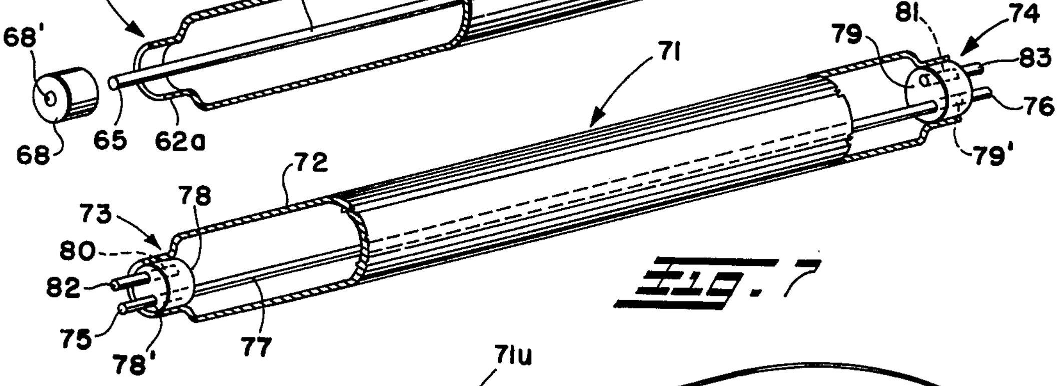
FIG. 7
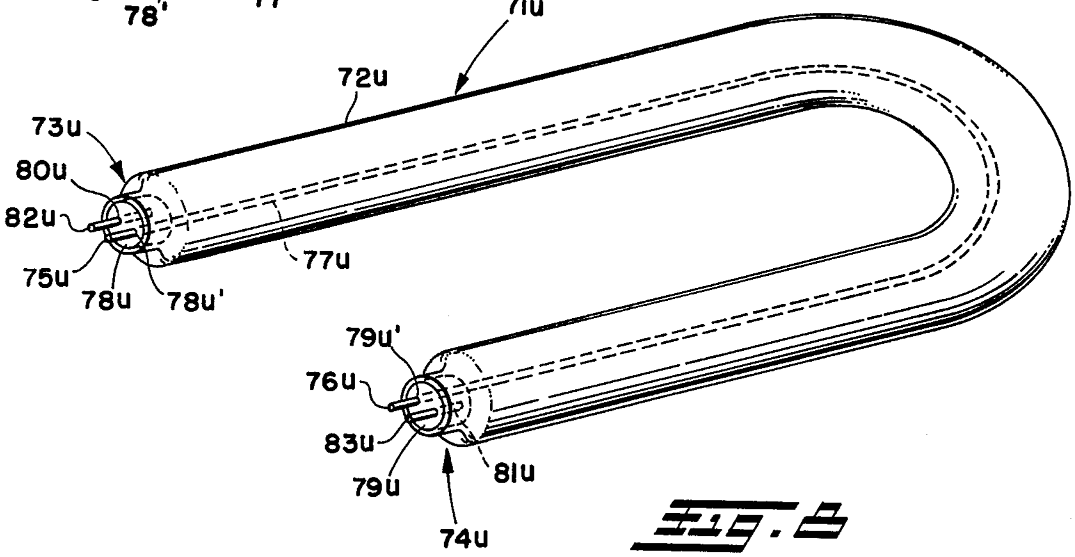
FIG. 8

FLUORESCENT LAMP INSERT WITH CONDUCTIVE ROD SUPPORT

BACKGROUND OF THE INVENTION

This application is a continuation-in-part of my co-pending U.S. patent application Ser. No. 575,628, filed May 8, 1975, for "Fluorescent Lamp Simulator", now U.S. Pat. No. 4,053,811.

The present invention is directed to a non-light emitting insert for fluorescent lighting fixtures, and more particularly is directed to such an insert used in place of a removed fluorescent lamp from a plural lamp fluorescent lighting apparatus to effect electrical completion of the plural-lamp ballast-type electrical circuit.

With the increased importance being placed on energy conservation, steps have been taken to reduce the lighting levels in many commercial and industrial buildings so as to effect a reduction in the electric power consumed for lighting purposes. Illumination and power levels can be reduced in an incandescent fixture simply by removing alternate incandescent lamps, or by replacing them with lamps of reduced wattage.

On the other hand, for energizing the fluorescent lamps of fluorescent lighting fixtures or other electric discharge lamps in respective lighting fixtures, one or more ballast circuits are necessary to create the required high starting voltages and to limit current after the arc is struck. Moreover, removal of one of the plural lamps from a plural lamp ballast circuit usually will have a detrimental effect on operation of any remaining fluorescent lamps, the operation of the ballast-type electric circuit, or the longevity of any remaining fluorescent lamps and/or the components of the ballast circuit. For example, the remaining lamp may only glow and will not start or the ballast may heat to an undesirably high temperature and/or may over drive the remaining lamp. One reason for such usually encountered detrimental effect is the normally required electrical balance for proper operation of a ballast circuit, which may include transformers, chokes, capacitors, or other electrical components, and such circuits will not operate properly if the electrical balance thereof is radically distorted.

To avoid the above-mentioned and other detrimental effects, one practice that has been followed to reduce light levels and consumed power in commercial and industrial buildings using fluorescent lighting has been completely to extinguish the fixture or at least all the lamps in a respective ballast circuit thereof by removal of those lamps or to deenergize the fixture by rewiring alternate fluorescent lighting fixtures located, for example, along a corridor, in a work area, and so on. One problem experienced when alternate lighting fixtures are extinguished or deenergized is the large unbalanced lighting effect, whereby areas located rather proximate to energized fixtures will be relatively bright but those areas located between energized fixtures and especially located proximate an extinguished fixture will be quite dark. Another drawback to extinguishing alternate fixtures is that the ballast circuit may still draw electric power even though the fluorescent lamps may have been removed from that circuit, therefore unnecessarily wasting electric power, and any rewiring to avoid this waste would be very expensive.

Several types of fluorescent lighting fixtures most commonly used today are the instant start type and rapid start type, and each usually includes a two lamp series sequence ballast circuit. The two lamps operated by one ballast may be in a single plural lamp fixture or in plural single lamp strip lights, for example. An instant start lamp has two single pin electrical terminations or bases and a rapid start lamp has a pair of pins coupled across a cathode heater at each of its bases. Various types of high output fluorescent lamps have special recessed double contact bases or terminations. The electrical properties of a fluorescent lamp are such that it exhibits a high resistance or impedance at starting and a much lower resistance or impedance after the arc is struck and current flows through the lamp, and the energizing ballast circuits are designed with respect to those properties. A principal difference between a conventional two lamp instant start ballast circuit and a two lamp rapid start ballast circuit is that the former does not provide for cathode heating after the arc is struck but the latter includes circuitry for continuous heating of the lamp cathodes.

SUMMARY OF THE INVENTION

The fluorescent light simulator or insert of the present invention completes or at least substantially completes the ballast circuit of a fluorescent lighting fixture from which one of the normally two, for example, fluorescent lamps operated in that ballast circuit has been removed. The insert, to an extent, duplicates the electrical characteristics of the removed lamp in the ballast connection so that the ballast circuit will operate under approximately normal conditions to effect approximately normal operation of the remaining lamp. Using the present invention a fluorescent lamp can be removed from a fixture for downward adjustment of the lighting level with a substantially proportional saving of electric power. Such downward adjustment of the lighting level is possible without damage to existing fluorescent lighting system ballasts and, particularly, permits one lamp in a standard two lamp fluorescent circuit to remain energized to produce a full light output.

Moreover, the insert may employ an electrically conductive, relatively rigid rod within the tubular body of the insert to provide the main supportive capacity of the latter while reducing mechanical stress on the body and to provide the ballast circuit completing function of the insert. The rod may be coupled to the body by resilient members to form a structure having external characteristics similar to those of the fluorescent lamp being replaced. This construction may be more expeditious and less expensive than manufacture employing typical bases of a fluorescent tube.

With the foregoing in mind, it is a primary object of the invention to conserve electrical energy and, more particularly, to effect such conservation by replacement in a fluorescent lighting arrangement of a fluorescent lamp with the insert of the present invention.

Another object of the invention is to provide for substantially normal operation of a plural lamp fluorescent ballast circuit from which one of such lamps has been removed.

An additional object of the invention is to complete a plural lamp ballast circuit from which at least one lamp has been removed so as to maintain effective operation of such ballast circuit to energize any remaining lamps.

A further object of the invention is to reduce electric power consumption in lighting fixtures by reducing the light output therefrom while maintaining a reasonably balanced lighting effect.

Still another object of the invention is to maintain even lighting levels in an area illuminated by a plurality of fluorescent lighting fixtures while reducing the average illumination and consumed electric power.

Still an additional object is to facilitate the construction of a fluorescent lamp simulator insert.

These and other objects and advantages of the present invention will become more apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 6 is a partially exploded perspective view, partly broken away, of a single pin base fluorescent lamp insert with an electrically conductive rod support;

FIG. 7 is a perspective view, partly broken away, of a bi-pin base fluorescent lamp insert with an electrically conductive rod support; and FIG. 8 is a perspective view of a bi-pin base, U-shape fluorescent lamp insert with an electrically conductive rod support.

DESCRIPTION OF THE PREFERRED EMBODIMENTS

Figures 1, 2, 2A, 2B, 3, 4, 5:
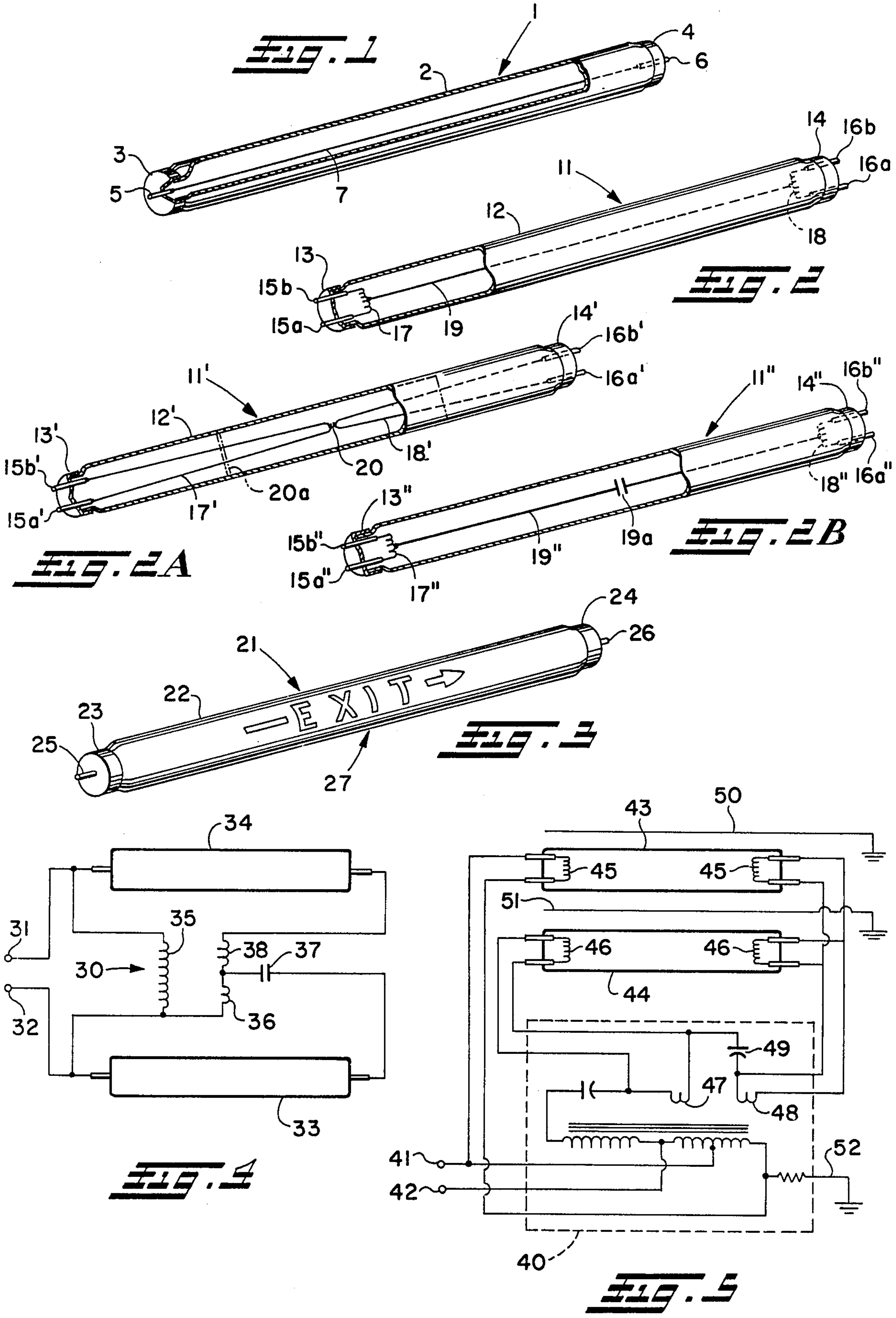
FIG. 1 is a perspective view, partially broken away, of a fluorescent lamp insert for use as a replacement for a conventional instant start fluorescent lamp.
FIGS. 2, 2A and 2B are perspective views, partially broken away, of fluorescent lamp inserts for use, respectively, as a replacement for a conventional rapid start fluorescent lamp.
FIG. 3 is an isometric view of a fluorescent lamp insert in accordance with the invention and including a phosphorescent indicator on the body of the insert.
FIG. 4 is a conventional series-sequence ballast circuit for energizing two conventional instant start fluorescent lamps.
FIG. 5 is a conventional series-sequence ballast circuit for energizing two conventional rapid start fluorescent lamps.

Referring now more particularly to the drawings, wherein like reference numerals may be used to designate like parts in the several figures, a fluorescent lamp simulator insert, which simulates in shape and, to an extent, in electrical characteristics a conventional instant start fluorescent lamp, is generally indicated at 1 in FIG. 1. The fluorescent lamp insert 1 has a tubular body 2, which may be formed, for example, of glass, plastic or other preferably electrically non-conductive, fragile or non-fragile material and, although shown in a cylindrical configuration, the tubular body may be shaped as a toroid or in another configuration, as desired. At the ends of the tubular body 2 are respective end terminations, such as end caps 3, 4, which may be electrically conductive or non-conductive, and opposed electrically conductive pins or terminals 5, 6 pass through the respective end caps 3, 4, to provide for electrically coupling of a wire 7, such as bell wire, located inside the tubular body 2 to the typical connections found in the lamp receiving sockets of a conventional fluorescent lighting fixture.

Although the fluorescent lamp insert 1 has an external appearance similar to that of a conventional instant start fluorescent lamp, the hollow tubular body 2 may be air filled, and there is no need for any air-tight seals between the tubular body and the respective end terminations. The pins 5, 6 may be electrically insulatively supported in the respective end caps, if desired, and the tubular body 2 may be either transparent, translucent, or opaque, as desired. The wire 7 provides a direct electrical connection between the pins 5, 6 preferably without any appreciable electrical resistance to avoid unnecessary energy dissipation.

Preferably the insert 1 is designed to simulate the appearance of a conventional instant start fluorescent lamp, and it is, more importantly, intended to simulate the electrical properties of such a conventional fluorescent lamp with respect to the fluorescent ballast circuit used to energize the latter. The wire 7 in the insert 1 provides the electrical property of low electrical resistance between the pins 5, 6, thus simulating the steady state or on electrical characteristic of a conventional fluorescent lamp without any appreciable energy dissipation.

A fluorescent lamp insert in accordance with the invention has been satisfactorily tested in a conventional plural lamp series-sequence fluorescent ballast circuit, such as the circuit shown in FIG. 4, which will be discussed in more detail below. In the course of the mentioned testing, one of the two conventional fluorescent lamps coupled in the ballast circuit was replaced by the insert of the invention, and it was found that the ballast circuit was successfully operable to effect proper energization of the remaining fluorescent lamp. Moreover, the electric power consumed by the ballast circuit including one fluorescent lamp and one fluorescent lamp insert was reduced by slightly less than fifty percent of the electrical energy consumed when two fluorescent lamps were connected in the ballast circuit. Moreover, during such testing the above-described possible detrimental effects to the ballast circuit or the remaining fluorescent lamp were not encountered, and the temperature of the ballast did not experience any appreciable variation from the normal ballast temperatures.

Although in the preferred embodiment the wire connection 7 of the insert 1 is substantially electrically conductive, it may be desirable in some circumstances to increase the resistivity thereof to maintain a reasonable electrical balance in the ballast circuit, and such increase may be effected by adding resistance in the wire connection between the pins 5, 6 or the wire itself may be formed of an electrically resistive material such as, for example, Nichrome wire. The simulation of the steady state operative electrical property of a fluorescent lamp by a relatively conductive wire 7 between the pins 5, 6 has been found satisfactory for the intended purpose of the invention; however, it may be desired to add between the pins 5, 6 additional electrical circuitry that would briefly provide a high resistance when the ballast circuit is turned on so as more exactly to simulate the effect of a fluorescent lamp. Such additional circuitry may automatically cut itself out and reinstate the direct connection of the wire 7 between the pins 5, 6 at a time equivalent to that required for the arc to be struck in a conventional instant start fluorescent lamp.

Turning now more particularly to FIG. 2, a fluorescent lamp simulator insert, which is substantially in the external configuration of a conventional rapid start fluorescent lamp, is generally indicated at 11. The insert 11 includes a generally tubular body 12 and a pair of end termination caps 13, 14 therefor, all of which may be similar to the elements described above with reference to the fluorescent lamp insert 1 of FIG. 1. A first pair of electrically conductive pins 15*a*, 15*b* pass through the end cap 13, and a second pair of electrically conductive pins 16*a*, 16*b* pass through the end cap 14; and to each pair of pins is connected a respective resistor 17, 18 to simulate the resistive effect of the cathode heaters in a conventional rapid start fluorescent lamp. In the preferred embodiment each of the resistors 17, 18 is formed of electrically resistive material, such as Nichrome wire, which is preferably selected to have a resistance approximately equivalent to the cathode heaters of a conventional rapid start fluorescent lamp, although conventional carbon-type or other types of resistors may be used. Since in operation of insert 11 there normally would be a voltage drop across the two of each pair, the pins would require electrical isolation either by non-conductive end caps 13, 14 or by respective insulators, not shown, in the end caps. A wire 19 coupled between the approximate linear centers of the two Nichrome wire resistors 17, 18 has an effect similar to the wire 7 described above to simulate the relatively low electrical resistance between the two cathode heaters of a conventional rapid start fluorescent lamp in which the arc has already been struck. As also mentioned above, some resistance may be added in the wire connection 19.

A modified rapid start fluorescent lamp insert is shown at 11' in FIG. 2A, wherein primed reference numerals designate parts that correspond to those shown in the fluorescent lamp insert 11 of FIG. 2. The modified insert 11' includes a pair of elongated resistors 17', 18', which may be of Nichrome wire or the like, each being of a resistance approximately equal to the resistance of the respective cathode heaters in a conventional rapid start fluorescent lamp. The two resistance wires 17', 18' are joined, for example, by soldering, welding, or the like, approximately midway along the respective lengths as shown at 20. Resistance wires form a balanced bridged network by joining in the center such that the primary lamp current is allowed to seek its own path when flowing through the simulator to prevent its flow through the cathode heater windings in the ballast. Also, if desired, an electrically non-conductive spacer 20*a* may be inserted within the tubular body 12' to reduce vibrations in the wires 17', 18' during shipment to avoid breakage of the wires and/or to facilitate electrical isolation between oppositely located respective halves of each of the resistive wires 17', 18'.

Operation of the fluorescent lamp insert 11 or 11' is similar to operation of the fluorescent lamp insert 1 described above. During operation of the fluorescent lamp insert 11 or 11' the respective resistors 17, 18 or 17', 18' are, of course, coupled across the respective cathode heater energizing windings in the ballast circuit, as shown, for example, in FIG. 5, so as to limit current flow through those windings to avoid their burning out. If desired, the wire 19 of the insert 11, which may be bell wire, may be modified to include a resistive characteristics, for example, by substitution of Nichrome wire in its place, as described above, and may be used with a time delay circuit briefly to break the connection of the wire 19 in the manner described above with reference to FIG. 1 so as to simulate the relatively large starting impedance between the two cathode heaters of a conventional rapid start fluorescent lamp.

Another modified form of fluorescent lamp insert that was successfully tested in generally indicated at 11'' in FIG. 2B, wherein double primed reference numerals are used to indicate elements that correspond to those shown in FIG. 2. In the flourescent lamp insert 11'' a capacitor 19*a*, which is preferaby a relatively large electrolytic capacitor, is coupled in the line 19'' between the two resistors 17'' and 18''. To an extent the fluorescent lamp insert 11'' operates in a manner similar to the fluorescent lamp inserts 11 and 11', as described above; however, during such operation the capacitor 19*a* has an effect on the power factor operation of the ballast circuit in which the rapid start fluorescent lamp insert 11'' is used, such as the ballast circuit shown in FIG. 5, further to reduce energy consumption thereby and the light output of any remaining rapid start fluorescent lamp in the ballast circuit. Although the fluorescent lamp insert 11'' was successfully tested, such insert has a number of disadvantages, and the more preferred forms of the invention are shown in FIGS. 1, 2 and 2A. Several of the drawbacks to using the insert 11'' including the capacitor 19*a* include the added expense of the capacitor, the undesirable heat generated in and emanating from the capacitor, a reduced light output level of any remaining fluorescent lamp coupled in the ballast circuit, possible detrimental effects on the remaining components of the ballast circuit, and a possible reduction in life of any such remaining fluorescent lamps.

The tubular bodies 2, 12, 12', 12'', of the respective fluorescent lamp inserts may be transparent or somewhat opaque and in the latter case preferably would exhibit an appearance similar to that of a deenergized fluorescent lamp, which is an advantage for the sake of appearance when the fluorescent lighting fixture for which it is used is often not energized. On the other hand, it has been found that the mentioned opaque tubular body will have a relatively dark appearance when located proximate a normally energized fluorescent lamp. Therefore, for use, for example, in a normally energized plural lamp fluorescent lighting fixture it has been found more desirable to use a transparent tubular body insert for the sake of both appearance and maximum utilization of the reflective background of the lighting fixture.

Referring to FIG. 3, a further fluorescent lamp insert of the instant start type is generally indicated at 21. The fluorescent lamp insert 21 is simlar to the insert 1 of FIG. 1 and has a tubular body 22, end terminations 23, 24, electrically conductive pins 25, 26, and an internal wire, not shown but connected in the manner of the wire 7 as shown in FIG. 1. On or in the tubular body 22 is a phosphorescent material, which may be applied over the entire length of the body or, as illustrated, may be selectively applied to indicate an emergency exit with a directing arrow, as is shown generally in FIG. 3 at 27. The fluorescent lamp insert 21 will operate in the same manner as the fluorescent lamp insert 1 described above; however, in the event of a power failer, for example, eliminating all or substantially all of the light in a corridor, the phosphorescent indicator 27 will glow for a sufficient period of time to indicate the general direction that the corridor runs and to indicate the location of a most proximate exit. Although the phosphorescent material 27 is shown in FIG. 3 on an instant start type of fluorescent lamp insert, it, of course, may be used also with the rapid start fluorescent lamp inserts 11, 11′, 11″ as shown and described above with reference to FIGS. 2, 2A, 2B.

In FIG. 4 a series-sequence ballast circuit 30, which receives AC line voltage at input terminals 31, 32, is effective to start two conventional instant start fluorescent lamps 33, 34 in sequence a few thousandths of a second apart and then to operate the lamps in series. The conventional circuit 30 is shown and described on page 14 of an Engineering Bulletin 0-341, issued by GTE Sylvania Inc., Endicott Street, Danvers, Mass. As described in the mentioned publication, the primary winding 35, auxiliary winding 36, and capacitor 37 co-operate to supply a high starting voltage initially to the lamp 33, and before the lamp 33 lights, the auxiliary winding voltage subtracts from the primary voltage and the voltage of the secondary winding 38 so that there is insufficient voltage to start the lamp 34. After the lamp 33 has lit, however, current flowing through the capacitor 37 shifts the phase relationship between the auxiliary and secondary windings 36, 38 such that the voltages add and are sufficient to start the lamp 34. After starting, the two lamps 33, 34 are operated in series without any contribution by the auxiliary winding 36.

It should be clear that if one of the lamps 33, 34 were removed from connection in the ballast circuit 30, there could be no series energization of the remaining lamp without improper current flow through the ballast circuit 30. However, by substituting the insert 1 of FIG. 1, for example, for the fluorescent lamp 33 in the ballast circuit 30 of FIG. 4, the low impedance characteristic of an energized fluorescent lamp is presented to the ballast circuit, and the remaining lamp 34 will be properly energized by the then properly operated ballast circuit.

In FIG. 5 a conventional series-sequence ballast circuit 40, which receives AC line voltage at respective terminals 41, 42, is intended to energize a pair of rapid start fluorescent lamps 43, 44, each of which has a pair of cathode heaters 45, 46. The conventional ballast circuit 40 is also shown and described in the above-mentioned GTE Sylvania Engineering Bulletin 0-341. When the ballast circuit 40 is first turned on, the cathode heaters are heated at least in part by the transformer secondary heater windings 47, 48 so as to reduce the starting voltage requirements of the lamps. Approximately at the same time the capacitor 49 briefly causes nearly all of the ballast secondary voltage to be applied across the lamp 43 to start the same. After the lamp 43 is started, its resistance drops appreciably, and a large voltage is then available to start the lamp 44; and thereafter the lamps are operated in series in the conventional circuit 40. Moreover, for proper starting and safe operation of high output or very high output fluorescent lamps, conventional grounded strips 50, 51 may be required proximate the respective lamps, and a grounding connection 52 may be necessary for the ballast circuit.

In the event that one of the lamps 43, 44 were removed from connection in the ballast circuit 40, it would be clear that the ballast circuit then would not be balanced and would not operate in its designed conventional manner for energization of the remaining fluorescent lamps. However, by substituting a fluorescent lamp insert 11, 11′, or 11″, for example, for the rapid start fluorescent lamp 43 in the ballast circuit 40, a resistance always will be coupled across the respective heater windings 47, 48 limiting current therein to preclude their otherwise burning out, and the low impedance characteristic of an energized fluorescent lamp will be reflected in the circuit to ensure proper starting of the remaining fluorescent lamp 44, proper resistance across the heater windings 47, 48, and otherwise proper current flow through the various components of the ballast circuit 40.

Turning now to FIG. 6, there is illustrated a modified fluorescent lamp simulator insert 61 of the single pin base type, for example, for replacement of an instant start fluorescent lamp. The insert 61 has a tubular body 62 of glass, plastic or the like, which may be clear, frosted, etc., as described above, and a pair of opposite bases or terminations 63, 64 with respective protruding pins or pin-like portions 65, 66 for mechanical and electrical connection with the contacts in the sockets of a conventional fluorescent lighting fixture. The pin-like portions 65, 66 are the opposite ends of an electrically conductive, relatively rigid, elongate rod 67, for example of metal, and a pair of resilient plugs 68, 69, for example of rubber-like material, fit in cylindrically necked down portions 62*a*, 62*b* of the body for mechanically coupling the latter and the rod in a substantially integral structure. Preferably the rod 67 fits relatively snugly in plug holes 68′, 69′ and the plugs themselves fit relatively snugly in the tubular body 62, as is shown. The body portions 62*a*, 62*b* spread out the forces between the plugs and the body. The rod 67 provides the ballast circuit completing function of the insert 61, as described above, and when the insert is operatively placed in a fluorescent lighting fixture the rod effectively supports the body 62 via the plugs 68, 69. This insert construction eliminates the commonly used relatively expensive end caps and facilitates manufacturing of the insert whereby the rod 67 may be placed in the body 62 and the plugs 68, 69 may be somewhat forcibly slid over the ends of the rod into place snugly in the body generally as illustrated.

Although the insert 61 would be used generally in the manner described above, for example with reference to the insert 1 of FIG. 1, in an instant start type fixture and circuit, it, as well as the insert 1, may also be satisfactorily employed as a replacement for a bi-pin type rapid start fluorescent lamp substantially to complete the ballast circuit of a rapid start fixture. In the latter case it has been found that the rod 67 may electrically connect either one of the two contacts in the socket at one end of the fixture to either one of the two contacts at the opposite end to obtain effective operation of the plural lamp rapid start ballast circuit to energize the remaining lamp or lamps substantially to produce full lumen output without experiencing any significant detriment to the ballast circuit and, of course, with energy conservation as described above.

In FIGS. 7 and 8 are illustrated two similar fluorescent lamp simulator inserts 71, 71U with tubular bodies 72, 72U, the suffix "U" indicating a U-shape configuration, that are modified from the insert 61 of FIG. 6 in having bi-pin bases or terminations 73, 74, 73U, 74U that are particularly suited for connection in the two contact sockets of a rapid start fluorescent fixture. The pin-like portions 75, 76, 75U, 76U of the electrically conductive, relatively rigid rods 77, 77U are located snugly in the respective resilient plugs 78, 79, 78U, 79U in respective openings 78′, 79′, 78U′, 79U′ thereof. Also, in other openings 80, 81, 80U, 81U of the resilient plugs are snugly fitted additional pins 82, 83, 82U, 83U of electrically conductive or non-conductive material. The additional pins provide added mechanical stability to the inserts 71, 71U when connected in a fixture by somewhat balancing support forces for the insert between the rods 77, 77U and the bodies 72, 72U.

The inserts 71, 71U may be employed in the ways and for the purposes described above. In this regard the pin-like ends 75, 76, 75U, 76U may be located in respectively opposite openings of the plugs or in diagonally opposite openings, e.g. openings 78' and 80 of the insert 71, to obtain successful substantial completion of the ballast circuit in accordance with the invention. However, it has been found undesirable in a rapid start ballast circuit to provide simultaneously direct short circuiting connections between both of the respective contacts at one socket to the respective contacts of the other socket, for this type of connection may detrimentally affect the ballast circuit.

It will, of course, be understood that the fluorescent lamp inserts of the invention may be used in a plural lamp fluorescent lighting fixture, which uses one or more plural lamp ballast circuits for energization of respective lamps, and the invention also may be used in conjunction with a plural lamp ballast circuit that is wired, for example, to effect energization of plural fluorescent lamps located, respectively, in separate fluorescent lighting fixtures, such as in a plurality of single lamp strip lights. Also, while the invention has been described with reference to use in a two lamp ballast circuit, the fluorescent lamp inserts also may be used in ballast circuits that energize more than two lamps so as to increase the efficient use of such a ballast circuit when operated to energize less than the full complement of fluorescent lamps of which it is capable.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or priviledge is claimed are defined as follows:

1. For use in a lighting apparatus including a ballast circuit normally operable to effect energization of plural electric discharge lamps normally mounted in plural socket-type connectors of the lighting apparatus, the improvement comprising means for substantially completing said ballast circuit when one of said lamps has been removed from its respective socket-type connectors thereby to enable said ballast circuit effectively to energize at least one remaining lamp allowing normal lumen outout in circuit connection therewith, said means for substantially completing said ballast circuit comprising a relatively rigid, electrically conductive rod-like means for connecting a contact in one of said respective socket-type connectors to a contact in another of said respective socket-type connectors in the lighting apparatus, said rod-like means being exposed for direct mechanical and electrical connection to said respective socket-type connectors.

2. The improvement of claim 1, further comprising a tubular body substantially coextensive with said rod-like means, and coupling means for coupling said tubular body and said rod-like means substantially as an integral structure.

3. The improvement of claim 2, wherein said tubular body and said rod-like means are of generally U-shape.

4. For use in a lighting apparatus including a ballast circuit normally operable to effect energization of plural electric discharge lamps normally mounted in plural socket-type connectors of the lighting apparatus, the improvement comprising means for substantially completing said ballast circuit when one of said lamps has been removed from its respective socket-type connectors thereby to enable said ballast circuit effectively to energize at least one remaining lamp allowing normal lumen output in circuit connection therewith, said means for substantially completing said ballast circuit comprising a relatively rigid, electrically conductive rod-like means for connecting a contact in one of said respective socket-type connectors to a contact in another of said respective socket-type connectors in the lighting apparatus, a tubular body substantially coextensive with said rod-like means, and coupling means for coupling said tubular body and said rod-like means substantially as an integral structure, said coupling means comprising resilient plug-like members that fit relatively snugly in said tubular body and have respective openings through which respective ends of said rod-like means extend for connection with respective contacts of the socket-type connectors of the lighting apparatus.

5. The improvement of claim 4, wherein said tubular body comprises generally cylindrical portions for receiving said plug-like members.

6. The improvement of claim 4, further comprising pin means held by said plug-like members and mechanically connectable with respective contacts of the socket-type connectors for further supporting said tubular body.

7. The improvement of claim 6, wherein said rod-like means comprises a metal rod.

8. The improvement of claim 7, wherein said metal rod is U-shape.

* * * * *